United States Patent
Chen et al.

(10) Patent No.: US 10,373,067 B1
(45) Date of Patent: Aug. 6, 2019

(54) DOMAIN-SPECIFIC SENTIMENT KEYWORD EXTRACTION WITH WEIGHTED LABELS

(71) Applicant: INTUIT INC., Mountain View, CA (US)

(72) Inventors: Meng Chen, Sunnyvale, CA (US); Giovanni Seni, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 612 days.

(21) Appl. No.: 14/458,876

(22) Filed: Aug. 13, 2014

(51) Int. Cl.
*G06N 5/04* (2006.01)
*G06N 20/00* (2019.01)
*G06F 16/2457* (2019.01)

(52) U.S. Cl.
CPC ....... *G06N 20/00* (2019.01); *G06F 16/24578* (2019.01); *G06N 5/04* (2013.01)

(58) Field of Classification Search
None
See application file for complete search history.

(56) References Cited

U.S. PATENT DOCUMENTS 7,987,188 B2    7/2011  Neylon et al.

OTHER PUBLICATIONS

Keshav, et al., Content based Recommender System on Customer Reviews using Sentiment Classification Algorithms, International Journal of Computer Science & Information Technologies, vol. 5 Issue 3, May 2014, pp. 4782-4787.*
Pang, et al., Opinion Mining and Sentiment Analysis, Foundations and Trends in Information Retrieval, vol. 2, Nos. 1-2, 2008, pp. 1-135.*
Keshav, et al., Content based Recommender System on Customer Reviews using Sentiment Classification Algorithms, International Journal of Computer Science & Information Technologies, vol. 5 Issue 3, May 2014, pp. 4782-4787 (Year: 2014).*

* cited by examiner

*Primary Examiner* — Wilbert L Starks
(74) *Attorney, Agent, or Firm* — Patterson + Sheridan, LLP

(57) ABSTRACT

The disclosed embodiments provide a system for facilitating sentiment analysis. During operation, the system obtains a set of training data that includes a first set of content items containing words associated with a domain, a set of sentiment scores for the first set of content items, and a set of outcomes associated with the first set of content items. Next, the system uses the training data to train a statistical model for performing sentiment analysis that is specific to the domain. The system then enables use of the statistical model in generating a set of domain-specific sentiment scores for a second set of content items containing words associated with the domain.

24 Claims, 6 Drawing Sheets

DOMAIN-SPECIFIC SENTIMENT KEYWORD EXTRACTION WITH WEIGHTED LABELS

BACKGROUND

Related Art

The disclosed embodiments relate to sentiment analysis techniques for documents. More specifically, the disclosed embodiments relate to techniques for performing domain-specific sentiment keyword extraction with weighted labels.

Sentiment analysis may be applied to documents to determine the overall sentiment, attitude, and/or polarity of the documents' creators. For example, individual words or sentences of a document may be analyzed to determine if the opinions expressed in the document are positive, negative, or neutral. Sentiment scores associated with the words or sentences may then be combined to label the overall sentiment of the document as positive, negative, or neutral.

However, conventional sentiment-analysis techniques may be associated with a number of drawbacks. First, a sentiment-analysis system may be trained on a set of non-domain-specific documents, which may result in inaccurate sentiment scores and/or labels when the sentiment-analysis system is applied to documents in a particular domain. Second, the use of human judges to assess the sentiment or polarity of documents may be relatively accurate across a number of domains, but may also require significant time and resource expenditure that limits the scalability of such human-based sentiment analysis.

Consequently, sentiment analysis may be improved by mechanisms for adapting the sentiment-analysis systems to different domains and/or reducing overhead and costs associated with performing sentiment analysis using the sentiment-analysis systems.

SUMMARY

The disclosed embodiments provide a system for facilitating sentiment analysis based on words in content items. During operation, the system obtains a set of training data that includes a first set of content items containing words associated with a domain, a set of sentiment scores for the first set of content items, and a set of outcomes associated with the first set of content items. Next, the system uses the training data to train a statistical model for performing sentiment analysis that is specific to the domain. The system then enables use of the statistical model in generating a set of domain-specific sentiment scores for a second set of content items containing words associated with the domain.

In some embodiments, the system also uses the statistical model to generate the domain-specific sentiment scores for the second set of content items associated with the domain, and uses the domain-specific sentiment scores to identify a subset of content items from the second set of content items as relevant to a goal associated with the domain.

In some embodiments, the system also groups the subset of content items into a set of topics, and generates a set of content summaries associated with the set of topics from the subset of the content items.

In some embodiments, the goal is associated with improving a product related to the domain.

In some embodiments, each content item from the subset of content items is associated with a domain-specific sentiment score that is below a pre-specified threshold.

In some embodiments, using the training data to train the statistical model includes using the training data to populate a matrix comprising the set of sentiment scores and a set of metrics for a set of terms in the first set of content items, and using the matrix to train the statistical model.

In some embodiments, rows of the matrix represent the second set of content items, and columns of the matrix represent the metrics and the second set of sentiment scores.

In some embodiments, the set of metrics includes at least one of a term frequency-inverse document frequency (tf-idf), a length, a number of punctuation marks, a number of symbols, and a number of uppercase characters.

In some embodiments, using the training data to train the statistical model includes identifying contradictions between a subset of the sentiment scores and the outcomes, and downweighting a subset of the training data associated with the contradictions during training of the statistical model.

In some embodiments, the statistical model includes a regularized logistic regression model.

BRIEF DESCRIPTION OF THE FIGURES

In the figures, like reference numerals refer to the same figure elements.

DETAILED DESCRIPTION

Figure 1:
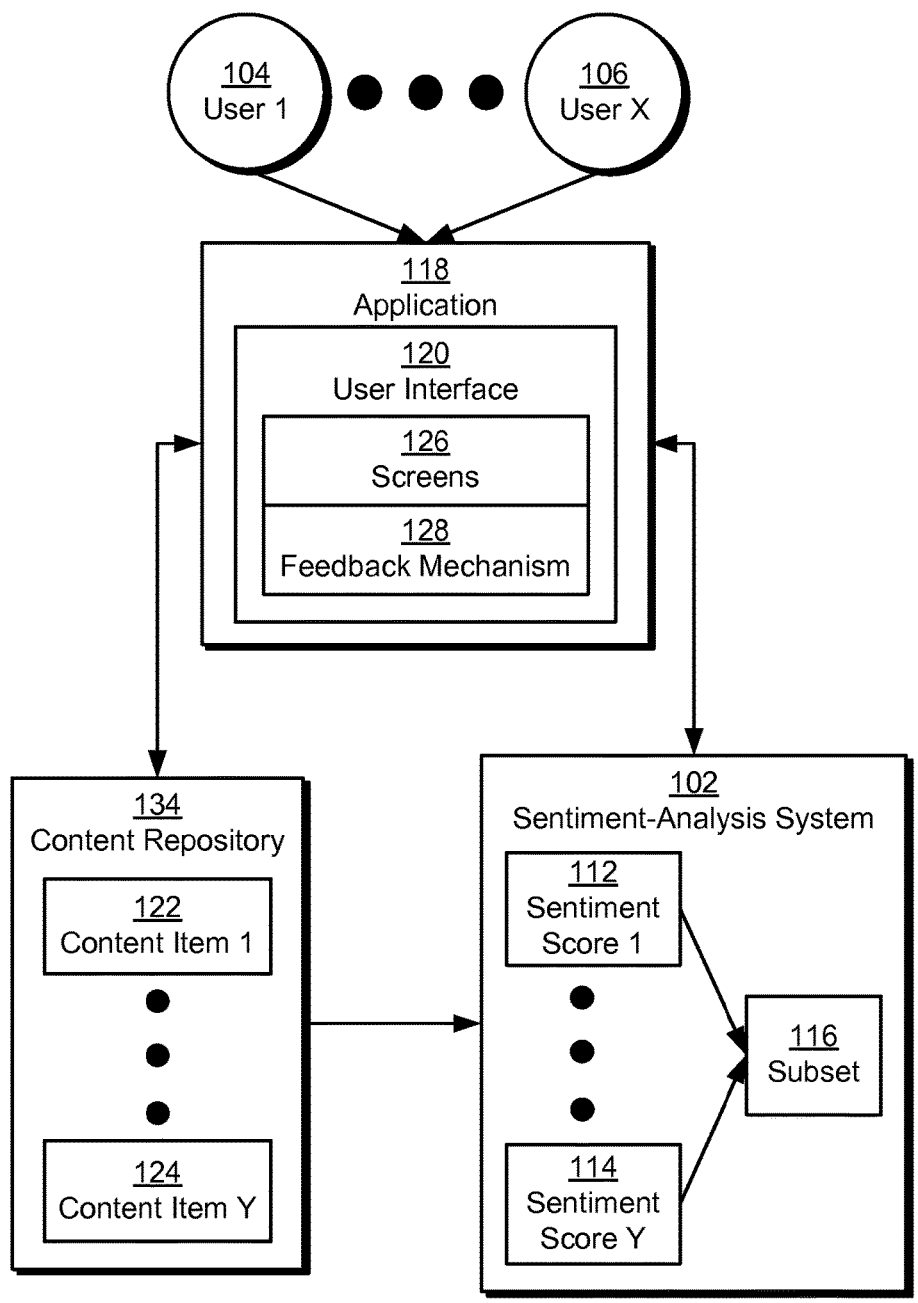
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and system for facilitating sentiment analysis. More specifically, the disclosed embodiments provide a method and system for performing domain-specific sentiment keyword extraction with weighted labels. To perform such domain-specific sentiment analysis, a set of domain-specific training data may be used to train a statistical model such as a regularized logistic regression model, support vector machine (SVM), artificial neural networks (ANN), naïve Bayes classifier, decision tree, regression model, and/or other model that employs a statistical and/or classification technique. The statistical model may be used to generate domain-specific sentiment scores for content items that include words in the domain. For example, the statistical model may be used to score user feedback for an application, website, product, and/or service as positive, negative, or neutral.

The statistical model may be trained using training data that includes a first set of content items (e.g., documents) containing words (e.g., user feedback) associated with the domain, a set of non-domain-specific sentiment scores for the content items, and a set of outcomes (e.g., indicating whether the users continue to use a product, good or service associated with the content items) associated with the content items. The training data may be used to populate a matrix containing the sentiment scores and a set of metrics for terms found in the first set of content items, and the statistical model may be trained using the matrix. Contradictions between a subset of the sentiment scores and the outcomes may also be identified and used to downweight a subset of the training data associated with the contradictions during training of the statistical model.

Once the statistical model is trained, the statistical model may be used to generate a set of domain-specific sentiment scores for a second set of content items containing words associated with the domain, which in turn may be used to identify a subset of the content items as relevant to a goal associated with the domain. For example, the domain-specific sentiment scores may enable the identification of user feedback that is highly negative in sentiment, such as user feedback related to bad user experiences with an application, website, product, and/or service. The negative feedback may then be flagged for review to enable responses to the feedback and/or improvement of a product related to the domain and/or feedback.

FIG. 1 shows a schematic of a system in accordance with the disclosed embodiments. As shown in FIG. 1, an application 118 may be used by a set of users (e.g., user 1 104, user x 106) through a set of electronic devices. For example, application 118 may be a software program that is executed by an electronic device such as a personal computer (PC), laptop computer, tablet computer, mobile phone, portable media player, personal digital assistant, and/or server computer.

In addition, application 118 may be application software such as a word processor, an email client, a web browser, a web application, and/or a financial-management application. Application 118 may thus be used to perform one or more tasks for users of application 118. For example, application 118 may be an email client, a personal financial-management application, a tax-preparation application, a business accounting application, a game, or a social-networking application.

Application 118 may be distributed across one or more machines and accessed in various ways. For example, application 118 may be installed on a personal computer (PC) and executed through an operating system on the PC. Alternatively, application 118 may be implemented using a client-server architecture, in which application 118 executes on one or more servers and is accessed from other machines using a locally installed executable and/or a web browser and network connection. In other words, application 118 may be implemented using a cloud computing system that is accessed over the Internet.

Moreover, the users may interact with application 118 through a user interface 120 of application 118. For example, the users may provide interactive input (e.g., page clicks, text input, file uploads, gestures, etc.) to application 118 through a graphical user interface (GUI) provided by application 118 and access text, images, audio, video, documents, menus, icons, form fields, web pages, and/or other elements of application 118 through the same GUI. Those skilled in the art will appreciate that other types of user interfaces, such as command-line interfaces (CLIs) and/or web-based user interfaces, may also be used by application 118. Thus, application 118 is able to perform tasks by receiving input from and providing output to the users through user interface 120.

Those skilled in the art will appreciate that a user's overall experience with application 118 may be affected by factors such as the user's familiarity with application 118, the user's knowledge of the domain of application 118, and/or the design or layout of application 118. For example, application 118 may be a tax-preparation application with tens of thousands of screens (e.g., screens 126) that cover a variety of tax-related topics. As a result, a user who is unfamiliar with accounting and/or tax-preparation principles may find the tax-preparation application to be difficult or confusing to use, while an accountant may use the tax-preparation application with little to no trouble.

Furthermore, a user's experience with application 118 may affect his/her subsequent use of the application. For example, a user of a "try before you buy" application may choose not to purchase the application after experiencing difficulty and/or boredom with the application. Along the same lines, a user may increase support costs for the application by contacting technical support if the user cannot understand or use a feature of the application.

To improve user experiences with application 118, application 118 may include a feedback mechanism 128 that allows the users to provide feedback related to the users' experiences with application 118. For example, feedback mechanism 128 may include one or more buttons, text boxes, checkboxes, sliders, and/or other user-interface elements that allow each user to rate one or more aspects of their experience (e.g., ease of use, functionality, layout, cost, etc.) with application 118, indicate if the user is likely to recommend application 118 to other users, and/or provide freeform (e.g., text-based) feedback related to application 118. Feedback submitted by the users may be stored as a set of content items (e.g., content item 1 122, content item y 124) in a content repository 134 for subsequent retrieval and use. For example, each freeform piece of feedback from a user may be stored as a content item in a database, data warehouse, cloud storage, and/or other data-storage mechanism providing content repository 134, along with numeric and/or Boolean values representing the user's ratings of application 118 and/or yes or no answers to questions in feedback mechanism 128.

Content repository 134 may thus contain a large number of freeform, unstructured content items for manual review by developers and/or designers of application 118. For example, a tax-preparation application may receive tens of millions of comments or pieces of feedback from users, which is far more than can be read in a timely or practical manner by the tens or hundreds of developers and/or designers of the tax-preparation application.

In one or more embodiments, the system of FIG. 1 facilitates the efficient use of feedback from users of application 118 by filtering and/or summarizing the feedback based on the sentiment of the feedback. More specifically, a sentiment-analysis system 102 may generate a set of sentiment scores (e.g., sentiment score 1 112, sentiment score y 114) for content items in content repository 134. For example, sentiment-analysis system 102 may generate, for each content item (e.g., piece of user feedback), a sentiment score from 0 to 1, with 0 representing extremely negative feedback and 1 representing extremely positive feedback.

Next, sentiment-analysis system 102 may use the sentiment scores to identify a subset 116 of the content items as relevant to a goal associated with application 118. For example, sentiment-analysis system 102 may apply a threshold to the sentiment scores so that subset 116 contains content items with sentiment scores below the threshold. In other words, sentiment-analysis system 102 may include content items with strongly negative sentiments in subset 116 to facilitate goals such as discovering product gaps in application 118, increasing the ability to listen to the users of application 118, and/or identifying opportunities for improvement in application 118. Such content items may then be flagged for review by developers, designers, and/or other people involved in the creation of application 118. Consequently, sentiment scores from sentiment-analysis system 102 may enable the identification of important and/or relevant user feedback among a large set of content items in content repository 134.

Those skilled in the art will appreciate that conventional sentiment-analysis analysis techniques may inaccurately generate sentiment scores for domain-specific specific documents and/or content items. For example, a sentiment-analysis tool may be trained on documents such as movie reviews and/or social media posts to generate lists of positive or negative words that are subsequently used to calculate sentiment scores for other documents. However, the context or domain in which the sentiment-analysis tool was trained may be different from the context or domain of documents to be scored by the sentiment-analysis tool. As a result, the limited vocabulary and context of the sentiment-analysis tool may preclude accurate classification or scoring of documents in other domains or contexts, such as documents containing feedback related to application 118.

In one or more embodiments, sentiment-analysis system 102 includes functionality to perform domain-specific sentiment analysis on content items containing feedback related to application 118. Such domain-specific sentiment analysis may be enabled by training a statistical model using training data that includes a first set of content items (e.g., documents) containing words associated with the domain, a set of non-domain-specific sentiment scores for the content items, and a set of outcomes associated with the content items. The training data may be used to populate a matrix containing the sentiment scores and a set of metrics for terms found in the first set of content items, and the statistical model may be trained using the matrix. Contradictions between a subset of the sentiment scores and the outcomes may also be identified and used to downweight a subset of the training data associated with the contradictions during training of the statistical model.

During such training, the statistical model may extract words from the training data that are positive or negative within the context or domain of application 118. Consequently, sentiment scores (e.g., sentiment score 1 112, sentiment score y 114) generated by the statistical model may be more accurate than conventional sentiment-analysis tools that are trained on data sets from other domains. Training and use of statistical models in performing domain-specific sentiment analysis is described in further detail below with respect to FIG. 2.

Figure 2:
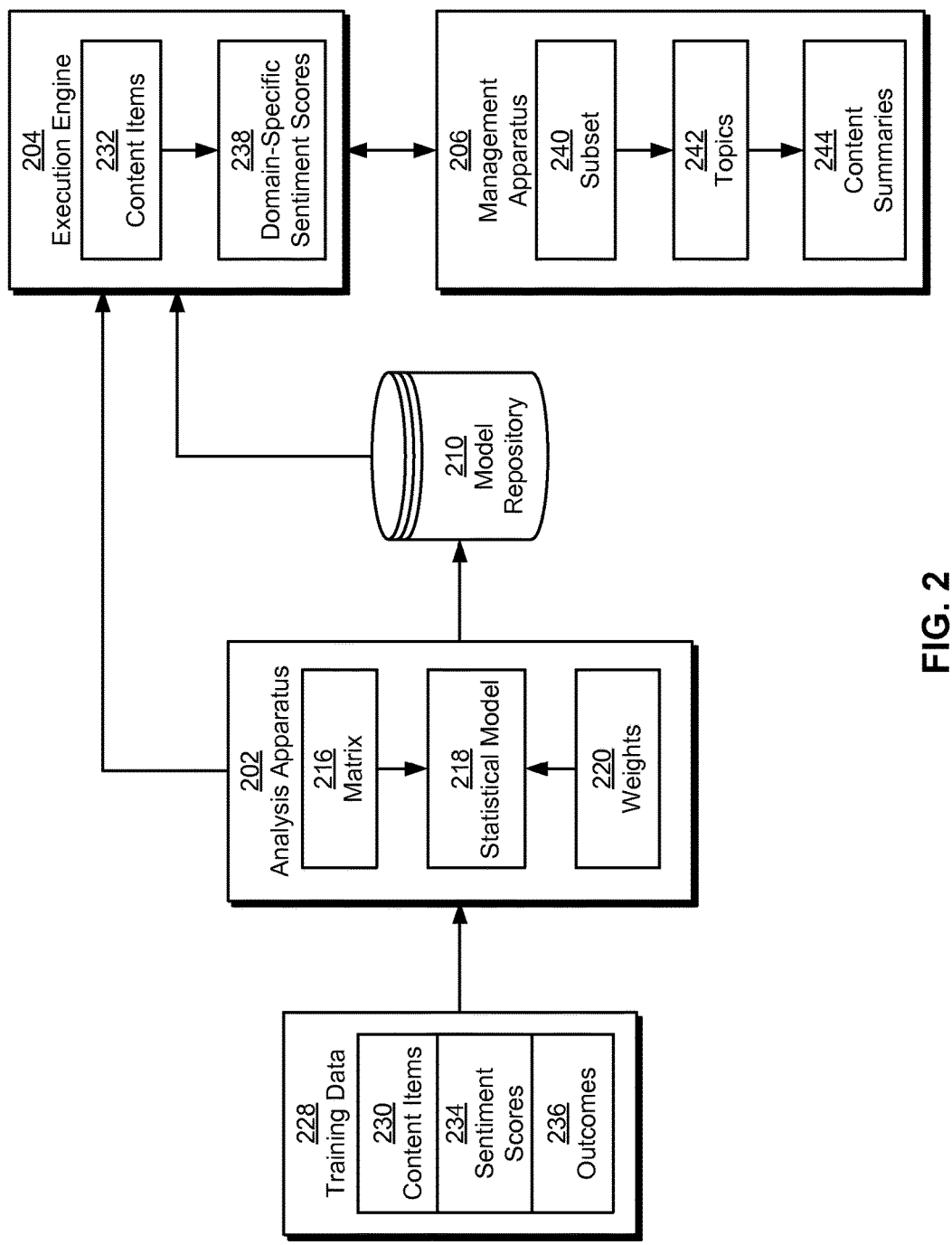
FIG. 2 shows a system for facilitating sentiment analysis in accordance with the disclosed embodiments.

FIG. 2 shows a system for facilitating sentiment analysis (e.g., as performed by sentiment-analysis system 102 of FIG. 1) in accordance with the disclosed embodiments. As mentioned above, the system of FIG. 2 may enable domain-specific sentiment analysis of a set of content items, such as text-based user feedback related to use of an application (e.g., application 118 of FIG. 1). As shown in FIG. 2, the system includes an analysis apparatus 202, an execution engine 204, and a management apparatus 206. Each of these components is described in further detail below.

Analysis apparatus 202 may train a statistical model 218 that performs domain-specific sentiment analysis. For example, analysis apparatus 202 may be configured to train statistical model 218 to perform sentiment analysis of user feedback for a service, application, and/or product. To train statistical model 218, analysis apparatus 202 may obtain training data 228 that includes a set of content items 230 associated with a particular domain, sentiment scores 234 for content items 230, and outcomes 236 associated with content items 230.

Content items 230 may include freeform text that is submitted by users. As a result, content items 230 may represent subjective opinions, attitudes, and/or feelings of the users. For example, content items 230 may include positive, negative, or neutral feedback and/or reviews of a specific product. The positive feedback and/or reviews may highlight positive aspects of the product, while the negative feedback and/or reviews may point out negative aspects of the product.

Sentiment scores 234 may be calculated for content items 230 using a standard sentiment-analysis technique that is not specific to the domain. For example, sentiment scores 234 may be produced using a sentiment-analysis tool that is trained using publicly available information such as social media posts and/or movie or restaurant reviews. As a result, sentiment scores 234 may be calculated without taking positive or negative words in the context of the domain into account.

Outcomes 236 may represent events that facilitate confirmation of sentiments related to content items 230. For example, outcomes 236 associated with user feedback on an application may be Boolean values that indicate whether the users providing the feedback continue using the application after a pre-specified period or discontinue using the application before the period elapses. In other words, outcomes 236 may represent attrition data for the users, with positive outcomes in the attrition data indicating continued use of the application within the period and negative outcomes in the attrition data indicating discontinued use of the application during the period.

Analysis apparatus 202 may use content items 230, sentiment scores 234, and outcomes 236 to populate a matrix 216 and/or generate a set of weights 220 that are used in the training of statistical model 218. In particular, analysis apparatus 202 may populate matrix 216 with data that facilitates domain-specific sentiment keyword extraction from content items 230, such as sentiment scores 234 and a set of metrics for a set of terms in content items 230. Population of matrices with training data for statistical models is discussed in further detail below with respect to FIG. 3.

Analysis apparatus 202 may also identify contradictions between a subset of sentiment scores 234 and outcomes 236. For example, analysis apparatus 202 may identify a first set of contradictions between positive sentiment scores 234 for user feedback related to use of an application and outcomes 236 that indicate that the users providing the feedback do not continue to use and/or pay for the application. Analysis apparatus 202 may additionally identify a second set of contradictions between negative sentiment scores 234 for the user feedback and outcomes 236 that indicate that users providing the feedback have continued to use and/or pay for the application.

To mitigate sub-optimal results from training statistical model 218 using contradictory training data 228, analysis apparatus 202 may downweight the subset of training data 228 associated with the contradictions. First, analysis apparatus 202 may generate a weight for training data 228 associated with each content item in content items 230 based on the sentiment score and outcome associated with the content item. Next, analysis apparatus 202 may apply the weight to sentiment scores 234 and/or other values in the training data before the training data is used to populate matrix 216 and/or train statistical model 218.

In particular, a content item with a sentiment score that agrees with the outcome (e.g., positive sentiment score and positive outcome, negative sentiment score and negative outcome) may be given a weight that is higher than 1 to boost the effect of training data associated with the content item on statistical model 218. On the other hand, a content item with a sentiment score that contradicts the corresponding outcome (e.g., a positive sentiment score and negative outcome, a negative sentiment score and positive outcome) may be given a weight that is less than 1 to reduce the effect of the content item's training data on statistical model 218. Finally, a content item with a neutral sentiment score may be assigned a weight of 1 to neither increase nor decrease the effect of training data related to the content item on statistical model 218. In other words, the weights may be used to increase or decrease the amount of emphasis given to each training case or observation.

By applying weights 220 based on the consistency of sentiment scores 234 and outcomes 236, analysis apparatus 202 may fine-tune the training of statistical model 218. For example, analysis apparatus 202 may increase or decrease weights 220 to increase or reduce the effects of various training cases on statistical model 218. Alternatively, analysis apparatus 202 and/or another component may remove contradictory training cases from training data 228 before using training data 228 to train statistical model 218.

After matrix 216 is created, analysis apparatus 202 may train statistical model 218 using matrix 216. For example, analysis apparatus 202 may fit a regularized logistic regression model to matrix 216 by solving an L1 regularized least squares problem using quadratic programming and/or numerical analysis techniques. After the regularized logistic regression model is trained, coefficients in the regularized logistic regression model may indicate the relative positivity or negativity of words, terms, keywords, and/or other attributes associated with content items 230 within the context of the domain.

Analysis apparatus 202 may then store statistical model 218 in a model repository 210 for subsequent execution by an execution engine 204. For example, analysis apparatus 202 may store statistical model 218 in a cloud storage system, distributed filesystem, database, and/or other type of data-storage mechanism. Alternatively, analysis apparatus 202 may provide statistical model 218 directly to execution engine 204 after training of statistical model 218 is complete.

Execution engine 204 may obtain statistical model 218 from model repository 210 and/or analysis apparatus 202 and load statistical model 218 in memory. Execution engine 204 may then execute statistical model 218 to generate a set of domain-specific sentiment scores 238 for a different set of content items 232 from content items 230 used to train statistical model 218. For example, execution engine 204 may be implemented by a batch data-processing mechanism such as Apache Hadoop (Hadoop™ is a registered trademark of the Apache Software Foundation Corp.). After a set of content items 232 is received by execution engine 204 (e.g., after content items 232 have been submitted by a set of users), the batch data-processing mechanism may use a set of nodes to execute statistical model 218 in parallel and calculate domain-specific sentiment scores 238 for content items 232. Because statistical model 218 is configured to identify positive and negative keywords in the domain of content items 232, domain-specific sentiment scores 238 may reflect the sentiments, moods, and/or attitudes associated with content items 232 better than non-domain-specific sentiment scores such as sentiment scores 234.

Domain-specific sentiment scores 238 may then be used to facilitate human understanding and/or processing of information in content items 232. More specifically, management apparatus 206 may use domain-specific sentiment scores 238 to identify a subset 240 of content items 232 as relevant to a goal associated with the domain. For example, management apparatus 206 may filter content items 232 containing feedback for a product so that content items 232 with domain-specific sentiment scores 238 above or below a pre-specified threshold are included in subset 240. Because subset 240 includes content items 232 with strongly positive and/or negative sentiments, subset 240 may facilitate goals related to marketing of a product, improvement of the product, and increased ability to listen to users of the product and/or discover shortcomings in the product.

Management apparatus 206 may further facilitate human understanding and/or processing of information in subset 240 by grouping content items in subset 240 into a set of topics 242 and/or generating a set of content summaries 244 of content items in subset 240. For example, management apparatus 206 may use a topic model to form clusters of content items in subset 240, with each cluster representing a different topic associated with the domain. After clusters of topics 242 have been generated, management apparatus 206 may extract key words or phrases from content items in the clusters and include the key words or phrases in content summaries 244 for topics 242.

Topics 242 and/or content summaries 244 may further reduce the amount of time and effort required to identify and extract relevant information from content items 232. For example, millions of content items 232 may be scored by execution engine 204 to identify tens of thousands of content items to be included in subset 240. However, subset 240 may still have too much content to be efficiently read by humans, so content items in subset 240 may be grouped into topics 242 and ranked within each topic to allow the most important messages in each topic to be read first. Content summaries 244 may also be generated from content items in each topic to provide an overview of important information in the topic to a human reader.

Those skilled in the art will appreciate that the system of FIG. 2 may be implemented in a variety of ways. First, analysis apparatus 202, execution engine 204, management apparatus 206, and/or model repository 210 may be provided by a single physical machine, multiple computer systems, one or more virtual machines, a grid, one or more databases, one or more filesystems, and/or a cloud computing system. Analysis apparatus 202, execution engine 204, and/or management apparatus 206 may additionally be implemented together and/or separately by one or more hardware and/or software components and/or layers.

Second, a number of statistical models and techniques may be trained and used by analysis apparatus 202, execution engine 204, and/or management apparatus 206. For example, domain-specific sentiment scores 238, topics 242, and/or content summaries 244 may be obtained using SVMs, ANNs, naïve Bayes classifiers, decision trees, regression models, and/or other type of statistical models, classification techniques, and/or matrix factorization techniques.

Figure 3:
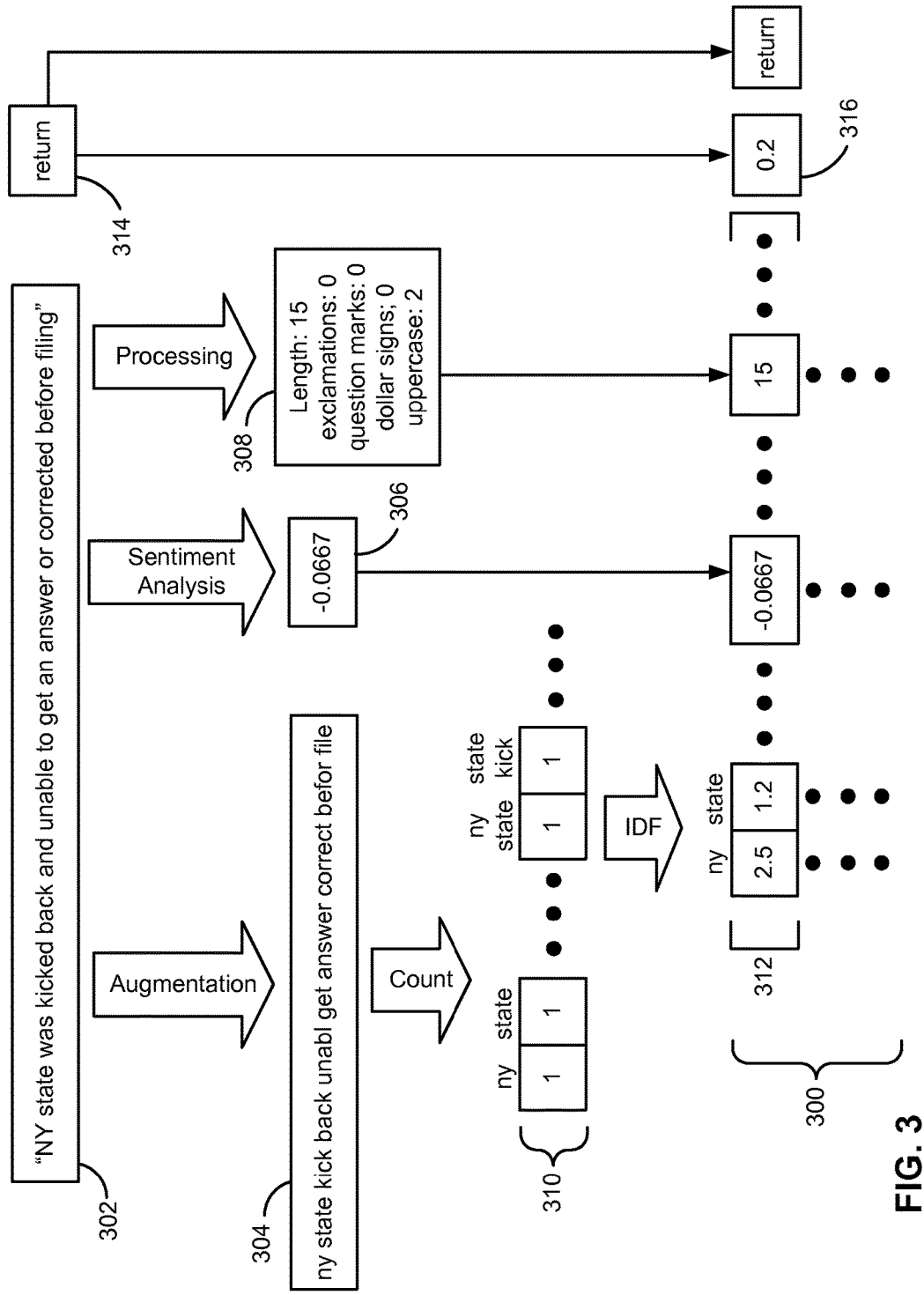
FIG. 3 shows the exemplary population of a matrix using training data associated with a content item in accordance with the disclosed embodiments.

FIG. 3 shows the exemplary population of a matrix 300 using training data associated with a content item 302 in accordance with the disclosed embodiments. As shown in FIG. 3, content item 302 may be received as a string of text (e.g., "NY state was kicked back and unable to get an answer or corrected before filing"). For example, content item 302 may be freeform, unstructured feedback from the user regarding use of an application, service, and/or other product.

To obtain training data for a statistical model (e.g., statistical model 218 of FIG. 2) from content item 302, unstructured text from content item 302 may be processed to obtain one or more sets of metrics that are then used to populate a row 312 of matrix 300. First, augmentation may be applied to content item 302 to remove stop words, punctuation, and numbers from text in content item 302; convert all characters in content item 302 to lower case; and/or perform stemming of the remaining words. The output of the augmentation step may include a set of root words 304 (e.g., "ny state kick back unabl get answer correct befor file") from content item 302.

Next, sentiment analysis may be applied to content item 302 and/or root words 304 to obtain a sentiment score 306 (e.g., −0.0667) for content item 302. As described above, sentiment score 306 may be generated using a sentiment-analysis technique that is not specific to the domain of content item 302. For example, sentiment score 306 may be calculated based on positive and negative words in the context of social media posts, movie reviews, and/or restaurant reviews, while content item 302 may be provided in the context of user feedback for a specific application such as a tax-preparation application. As a result, sentiment score 306 may represent an initial, non-domain-specific estimate of the sentiment or polarity of content item 302 that is subsequently used to train the statistical model and provide a better, domain-specific estimate of the sentiment or polarity of content item 302.

A set of term frequencies 310 may also be generated from single words, bigrams, and/or n-grams of root words 304. For example, term frequencies 310 may indicate that the words "ny" and "state" and the bigrams "ny state" and "state kick" each appears once in root words 304.

The original text of content item 302 may also be processed separately from root words 304 to obtain a set of metrics 308 related to the text, which may also be factors in determining the sentiment of content item 302. For example, metrics 308 may indicate that content item 302 has a length of 15 words, zero exclamation marks, zero question marks, zero dollar signs, and two uppercase characters.

Sentiment score 306, metrics 308, and term frequencies 310 may then be used to fill in elements of row 312, which represents content item 302 in matrix 300. Sentiment score 306 and metrics 308 may be copied directly to a set of elements in row 312. On the other hand, term frequencies 310 may further be processed by calculating an inverse document frequency (IDF) for each word, bigram, and/or n-gram represented in term frequencies 310 and including a term frequency-inverse document frequency (tf-idf) of the word, bigram, and/or n-gram in row 312. For example, row 312 may have tf-idfs of 2.5 and 1.2 for the terms "ny" and "state," respectively.

Matrix 300 may also be populated with other rows representing other content items to be used in the training data. Each content item may be processed using the steps shown in FIG. 3 to convert unstructured, freeform text into structured data that can be used by the statistical model. Columns of matrix 300 may thus represent different data elements (e.g., tf-idfs of n-grams, non-domain-specific sentiment, length, number of punctuation marks, number of symbols, number of uppercase characters, etc.) associated with the content items, which are populated with values (e.g., tf-idfs, sentiment scores, metrics) associated with the data elements.

Content item 302 may also be associated with an outcome (e.g., "return"), which may be used to produce a weight 316 (e.g., 0.2) for data in row 312. For example, outcome 314 may indicate that the user returned to a tax-preparation application the following year after providing the feedback in content item 302. As a result, outcome 314 may be a positive outcome that contradicts a negative sentiment score 306 for content item 302. In turn, weight 316 may be set to less than 1 and applied to one or more elements of row 312 (e.g., sentiment score 306) before the statistical model is fit to data in matrix 300 to reduce the effect of potentially contradictory training data in row 312 on the statistical model. Alternatively, a contradiction between outcome 314 and sentiment score 306 may cause row 312 to be omitted entirely from matrix 300. Outcome 314 may also be included in a column of matrix 300 for use in training the statistical model.

Figure 4:
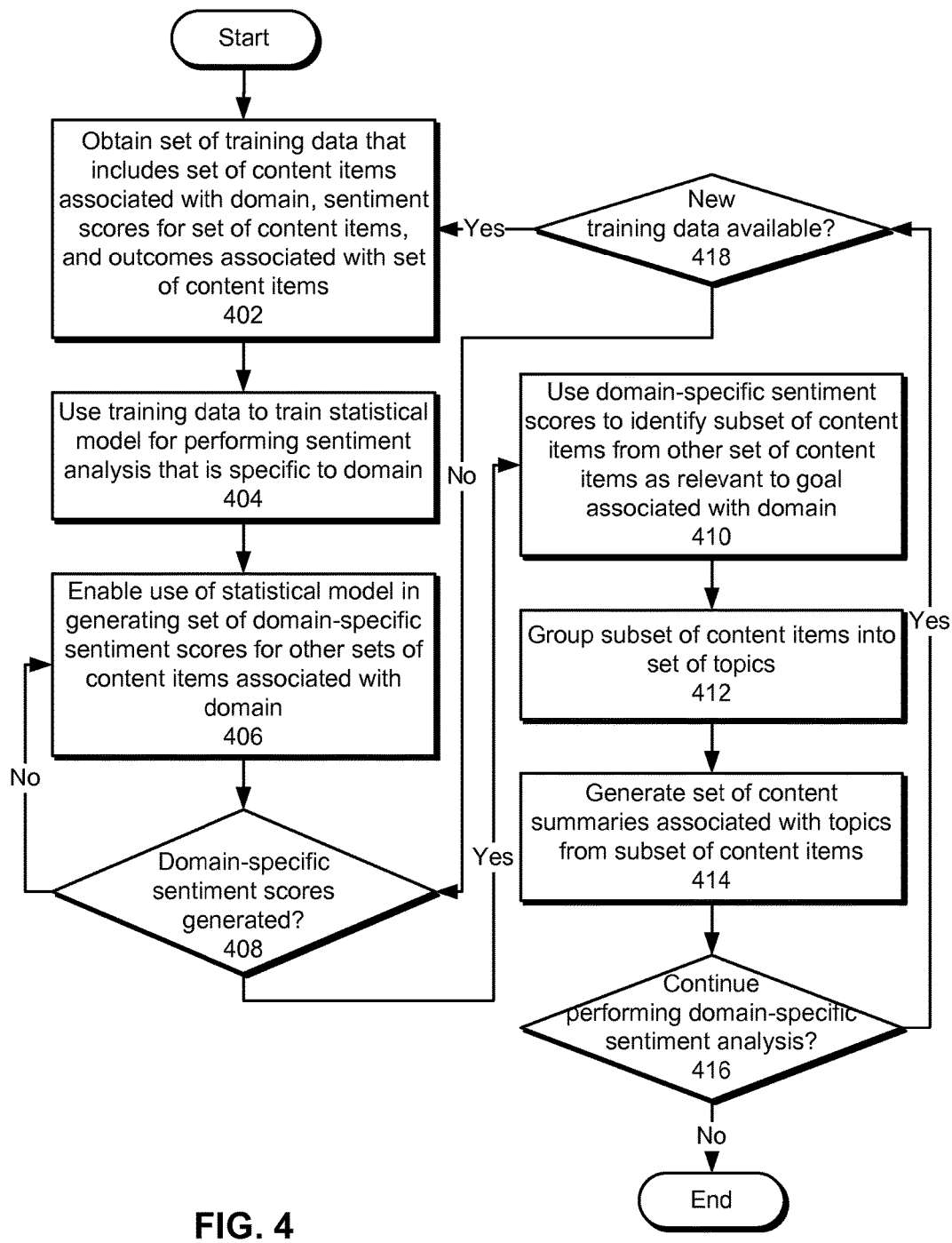
FIG. 4 shows a flowchart illustrating the process of facilitating sentiment analysis in accordance with the disclosed embodiments.

FIG. 4 shows a flowchart illustrating the process of facilitating sentiment analysis in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of training data that includes a set of content items associated with a domain, a set of sentiment scores for the content items, and a set of outcomes associated with the content items is obtained (operation 402). For example, the training data may include unstructured, freeform text representing the opinions of users; non-domain-specific sentiment scores for the opinions; and outcomes that indicate whether the users continue to use a product, good or service associated with the opinions. Next, the training data is used to train a statistical model for performing sentiment analysis that is specific to the domain (operation 404), as described in further detail below with respect to FIG. 5.

After the statistical model is trained, use of the statistical model in generating a set of domain-specific sentiment scores for other sets of content items associated with the domain is enabled (operation 406). For example, the statistical model may be stored in a model repository for subsequent retrieval and use by an execution engine (e.g., for batch processing of large sets of content items). Alternatively, the statistical model may be provided directly to the execution engine and loaded into memory in the execution engine for real-time generation of sentiment scores for one or more content items.

Once use of the statistical model is enabled, domain-specific sentiment scores may be generated (operation 408) for another set of content items by the statistical model. If domain-specific sentiment scores have not yet been generated by the statistical model, use of the statistical model may continue to be enabled (operation 406) so that domain-specific sentiment analysis may be performed on content items as the content items are received and/or made available.

Once a set of domain-specific sentiment scores has been generated from another set of content items, the domain-specific sentiment scores are used to identify a subset of the content items as relevant to a goal associated with the domain (operation 410). For example, the goal may be associated with improving and/or identifying shortcomings in a product associated with the domain. As a result, the subset may contain content items with domain-specific sentiment scores that are below a pre-specified threshold, such as the most negative 5% of content items.

The subset of content items may also be grouped into topics (operation 412), and a set of content summaries associated with the topics may be generated from the subset (operation 414). For example, topic-modeling techniques may be used to generate topic-based "clusters" of content items from the subset, and important text from content items in each cluster may be included in a content summary for the corresponding topic. The subset of content items, topics, and/or content summaries may thus facilitate human understanding of important information in the entire set of content items without requiring manual review of each content item in the set, which may be infeasible for large sets of content items.

Domain-specific sentiment analysis may continue to be performed (operation 416) using the statistical model. If domain-specific sentiment analysis is to be performed, the statistical model may be updated if new training data is available (operation 418). For example, the new training data may include words that reflect more recent attitudes and/or sentiments associated with the domain.

The training data may be used to train (e.g., retrain) the statistical model (operations 402-404) so that the statistical model is up-to-date with the changing context of the domain. If no new training data is available, the statistical model is not trained.

The statistical model may then be used to generate domain-specific sentiment scores (operations 406-408), identify a subset of content items as relevant to a goal associated with the domain (operation 410), group the subset into a set of topics (operation 412), and/or generate a set of content summaries from the subset (operation 414). Such processing of content items may continue until the statistical model is no longer used to perform domain-specific sentiment analysis of content items.

Figure 5:
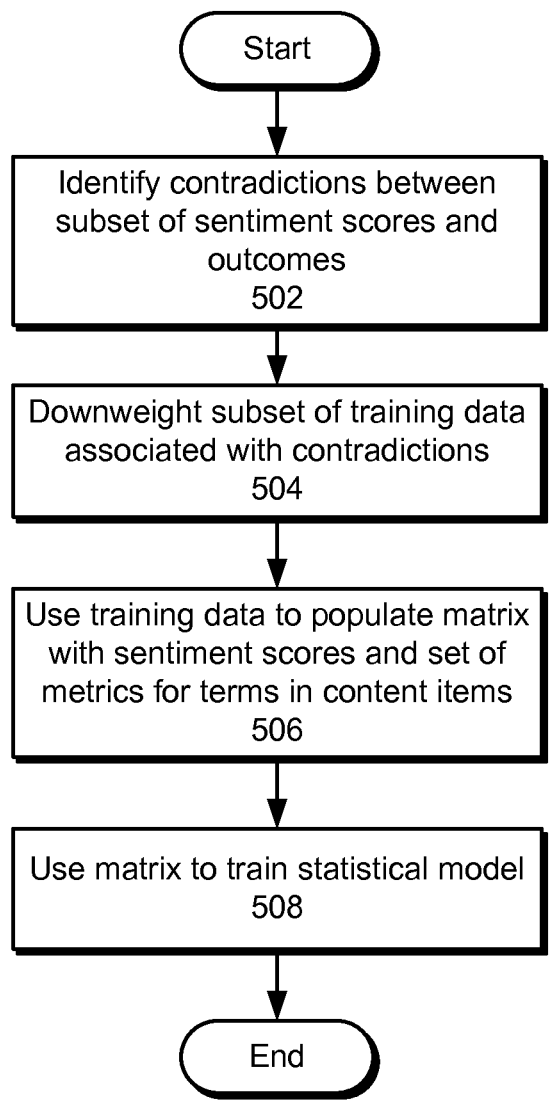
FIG. 5 shows a flowchart illustrating the process of training a statistical model for performing sentiment analysis that is specific to a domain in accordance with the disclosed embodiments.

FIG. 5 shows a flowchart illustrating the process of training a statistical model for performing sentiment analysis that is specific to a domain in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

As described above, the statistical model may be trained using training data that includes a set of content items associated with a domain, a set of sentiment scores for the content items, and a set of outcomes associated with the content items. To facilitate use of non-contradictory data in training the statistical model, contradictions between a subset of the sentiment scores and the outcomes are identified (operation 502), and a subset of the training data associated with the contradictions is downweighted (operation 504). For example, contradictions may be found between positive sentiment scores and negative outcomes, as well as between negative sentiment scores and positive outcomes. To mitigate adverse effects of contradictory data on training of the statistical model, sentiment scores and/or other values associated with the contradictions may be multiplied by a weight that is less than 1. On the other hand, sentiment scores and/or associated values that agree with the corresponding outcomes may be multiplied by a weight that is greater than 1.

Next, the training data is used to populate a matrix with the sentiment scores and a set of metrics for terms in the content items (operation 506). For example, the matrix may include, as metrics, the sentiment scores; tf-idfs for words, bigrams, and/or n-grams in the content items; a length (e.g., number of words); and/or a number of punctuation marks (e.g., exclamation marks, question marks, quotation marks, slashes), symbols (e.g., dollar signs, asterisks, etc.), and/or uppercase characters. Rows in the matrix may represent content items, and columns in the matrix may represent the metrics and/or sentiment scores. In addition, features (e.g., columns) that are irrelevant to the construction of the statistical model (e.g., low tf-idf terms, redundant features, etc.) may be removed from the matrix to reduce the complexity and/or overfitting of the statistical model.

Finally, the matrix is used to train the statistical model (operation 508). For example, the matrix may be provided as structured data to a regularized logistic regression model, and the regularized logistic regression model may be fit to data in the matrix by solving an L1 regularized least squares problem using quadratic programming and/or numerical analysis techniques.

Figure 6:
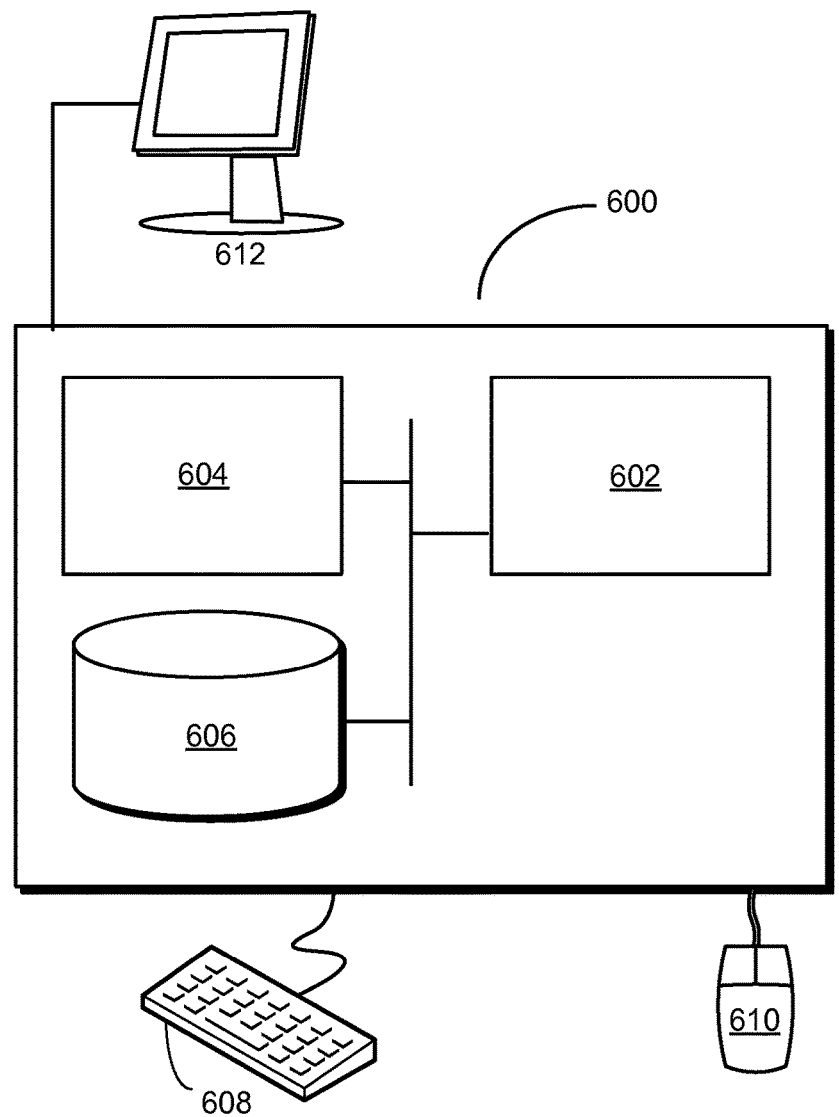
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating sentiment analysis. The system may include an analysis apparatus that obtains a set of training data that includes a first set of content items associated with a domain, a set of sentiment scores for the first set of content items, and a set of outcomes associated with the first set of content items.

Next, the analysis apparatus may use the training data to train a statistical model for performing sentiment analysis that is specific to the domain. The system may also include an execution engine that uses the statistical model to generate a set of domain-specific sentiment scores for a second set of content items associated with the domain. Finally, the system may include a management apparatus that uses the domain-specific sentiment scores to identify a subset of content items from the second set of content items as relevant to a goal associated with the domain.

In addition, one or more components of computer system 600 may be remotely located and connected to the other components over a network. Portions of the present embodiments (e.g., model repository, management apparatus, execution engine, analysis apparatus, etc.) may also be located on different nodes of a distributed system that implements the embodiments. For example, the present embodiments may be implemented using a cloud computing system that provides domain-specific sentiment analysis to content items from a set of remote users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating development of an application, comprising:
    establishing a network connection with each computer executing an application comprising a feedback user interface;
    receiving, from the feedback user interface of each computer, feedback about an application user's experience with the application obtained from a first plurality of application users, wherein the feedback includes a first set of unstructured text entries entered by the first plurality of application users to store in a data repository;
    generating, via a statistical model that performs domain-specific sentiment analysis, a domain-specific weighted score for each unstructured text entry in the first set of unstructured text entries stored in the data repository, wherein:
        the statistical model was trained using training data comprising:
            a second set of unstructured text entries from a second plurality of application users associated with a specific domain;
            a set of sentiment scores determined for the second set of unstructured text entries using a sentiment analysis technique not specific to the specific domain; and
            a set of outcomes based on whether an application user of the second plurality of application users associated with a respective unstructured text entry continued to use the application after entering the respective unstructured text entry; and
        wherein a subset of the training data associated with a set of contradictions between a subset of the set of sentiment scores not agreeing with a subset of the set of outcomes is downweighted;
    identifying a subset of the first set of unstructured text entries according to a threshold based on the domain-specific weight score for each unstructured text entry;
    generating a set of clusters of unstructured text entries corresponding to a set of topics associated with the specific domain, wherein each unstructured text entry in the subset of the first set of unstructured text entries is assigned to a cluster corresponding to a topic;
    extracting a set of keywords from the set of clusters of unstructured text entries;
    generating a set of content summaries for each topic in the set of topics based on the extracted set of keywords from each unstructured text entry in each cluster associated with each topic; and
    presenting the set of content summaries according to each topic associated with the application user's experience of the application to an application developer.

2. The computer-implemented method of claim 1, wherein the statistical model is a domain-specific statistical model.

3. The computer-implemented method of claim 1, wherein identifying the subset of the first set of unstructured text entries according to the threshold based on the domain-specific weight score for each unstructured text entry includes one of:
    identifying unstructured text entries having domain-specific weighted scores above a pre-specified threshold; and
    identifying unstructured text entries having domain-specific weighted scores below the pre-specified threshold.

4. The computer-implemented method of claim 1, wherein the statistical model was trained with a matrix populated with the set of sentiment scores and a set of metrics for the second set of unstructured text entries.

5. The computer-implemented method of claim 4, wherein:
    rows of the matrix represent unstructured text entries in the second set of unstructured text entries; and
    columns of the matrix represent metrics and sentiment scores.

6. The computer-implemented method of claim 4, wherein the set of metrics for a given unstructured text entry of the second set of unstructured text entries comprises at least one of:
    a term frequency-inverse document frequency (tf-idf) for each word in the given unstructured text entry;
    a length of the given unstructured text entry;
    a number of punctuation marks in the given unstructured text entry;
    a number of symbols in the given unstructured text entry; or
    a number of uppercase characters in the given unstructured text entry.

7. The computer-implemented method of claim 1, wherein the statistical model comprises a regularized logistic regression model.

8. The method of claim 1, wherein:
the identified subset of the first set of unstructured text entries comprises a set of unstructured text entries relevant to a specified goal associated with the specific domain; and
the specified goal comprises at least one of identifying a problem with a feature of the application or improving the feature of the application.

9. The method of claim 1, wherein the method further comprises:
ranking each unstructured text entry in a respective cluster associated with a respective topic; and
presenting the unstructured text entries according to the ranking.

10. A non-transitory computer-readable storage medium storing instructions that when executed by a computer cause the computer to perform a method for facilitating development of an application, comprising:
establishing a network connection with each computer executing an application comprising a feedback user interface;
receiving, from the feedback user interface of each computer, feedback about an application user's experience with the application obtained from a first plurality of application users, wherein the feedback includes a first set of unstructured text entries entered by the first plurality of application users to store in a data repository;
generating, via a statistical model that performs domain-specific sentiment analysis, a domain-specific weighted score for each unstructured text entry in the first set of unstructured text entries stored in the data repository, wherein:
the statistical model was trained using training data, wherein the training data comprises:
a second set of unstructured text entries from a second plurality of application users associated with a specific domain;
a set of sentiment scores determined for the second set of unstructured text entries using a sentiment analysis technique not specific to the specific domain; and
a set of outcomes
based on whether an application user of the second plurality of application users associated with a respective unstructured text entry continued to use the application after entering the respective unstructured text entry; and
wherein a subset of the training data associated with a set of contradictions between a subset of the set of sentiment scores not agreeing with a subset of the set of outcomes is downweighted;
identifying a subset of the first set of unstructured text entries according to a threshold based on the domain-specific weight score for each unstructured text entry;
generating a set of clusters of unstructured text entries corresponding to a set of topics associated with the specific domain, wherein each unstructured text entry in the subset of the first set of unstructured text entries is assigned to a cluster corresponding to a topic;
extracting a set of keywords from the set of clusters of unstructured text entries;
generating a set of content summaries for each topic in the set of topics based on the extracted set of keywords from each unstructured text entry in each cluster associated with each topic; and
presenting the set of content summaries according to each topic associated with the application user's experience of the application to an application developer.

11. The non-transitory computer-readable storage medium of claim 10, wherein the statistical model was trained with a matrix populated with the set of sentiment scores and a set of metrics for the second set of unstructured text entries.

12. The non-transitory computer-readable storage medium of claim 11, wherein:
rows of the matrix represent unstructured text entries in the second set of unstructured text entries; and
columns of the matrix represent metrics and sentiment scores.

13. The non-transitory computer-readable storage medium of claim 11, wherein the set of metrics for a given unstructured text entry of the second set of unstructured text entries comprises at least one of:
a term frequency-inverse document frequency (tf-idf) for each word in the given unstructured text entry;
a length of the given unstructured text entry;
a number of punctuation marks in the given unstructured text entry;
a number of symbols in the given unstructured text entry; or
a number of uppercase characters in the given unstructured text entry.

14. The non-transitory computer-readable storage medium of claim 10, wherein:
the identified subset of the first set of unstructured text entries comprises a set of unstructured text entries relevant to a specified goal associated with the specific domain; and
the specified goal comprises at least one of identifying a problem with a feature of the application or improving the feature of the application.

15. The non-transitory computer-readable storage medium of claim 10, wherein the method further comprises:
ranking each unstructured text entry in a respective cluster associated with a respective topic; and
presenting the unstructured text entries according to the ranking.

16. A system facilitating development of an application, comprising:
a processor;
a memory storing instructions that when executed by the processor performs a method, the method comprising:
establishing a network connection with each computer executing an application comprising a feedback user interface;
receiving, from the feedback user interface of each computer, feedback about an application user's experience with the application obtained from a first plurality of application users, wherein the feedback includes a first set of unstructured text entries entered by the first plurality of application users to store in a data repository;
generating, via a statistical model that performs domain-specific analysis, a domain-specific weighted score for each unstructured text entry in the first set of unstructured text entries stored in the data repository, wherein:
the statistical model was trained using training data, wherein the training data comprises:
a second set of unstructured text entries from a second plurality of application users associated with a specific domain;

a set of sentiment scores determined for the second set of unstructured text entries using a sentiment analysis technique not specific to the specific domain; and
a set of outcomes
outcome based on whether an application user of the second plurality of application users associated with a respective unstructured text entry continued to use the application after entering the respective unstructured text entry; and
wherein a subset of the training data associated with a set of contradictions between a subset of the set of sentiment scores not agreeing with a subset of the set of outcomes is downweighted;
identifying a subset of the first set of unstructured text entries according to a threshold based on the domain-specific weight score for each unstructured text entry;
generating a set of clusters of unstructured text entries corresponding to a set of topics associated with the specific domain, wherein each unstructured text entry in the subset of the first set of unstructured text entries is assigned to a cluster corresponding to a topic;
extracting a set of keywords from the set of clusters of unstructured text entries;
generating a set of content summaries for each topic in the set of topics based on the extracted set of keywords from each unstructured text entry in each cluster associated with each topic; and
presenting the set of content summaries according to each topic associated with the application user's experience of the application to an application developer.

17. The non-transitory computer-readable storage medium of claim 10, wherein the statistical model comprises a regularized logistic regression model.

18. The non-transitory computer-readable storage medium of claim 10, wherein identifying the subset of the first set of unstructured text entries according to the threshold based on the domain-specific weight score for each unstructured text entry includes one of:
identifying unstructured text entries having domain-specific weighted scores above a pre-specified threshold; and
identifying unstructured text entries having domain-specific weighted scores below the pre-specified threshold.

19. The system of claim 16, wherein the statistical model was trained with a matrix populated with the set of sentiment scores and a set of metrics for the second set of unstructured text entries.

20. The system of claim 19, wherein:
rows of the matrix represent unstructured text entries in the second set of unstructured text entries; and
columns of the matrix represent metrics and sentiment scores.

21. The system of claim 19, wherein the set of metrics for a given unstructured text entry of the second set of unstructured text entries comprises at least one of:
a term frequency-inverse document frequency (tf-idf) for each word in the given unstructured text entry;
a length of the given unstructured text entry;
a number of punctuation marks in the given unstructured text entry;
a number of symbols in the given unstructured text entry; or
a number of uppercase characters in the given unstructured text entry.

22. The system of claim 16, wherein:
the identified subset of the first set of unstructured text entries comprises a set of unstructured text entries relevant to a specified goal associated with the specific domain; and
the specified goal comprises at least one of identifying a problem with a feature of the application or improving the feature of the application.

23. The system of claim 16, wherein the method further comprises:
ranking each unstructured text entry in a respective cluster associated with a respective topic; and
presenting the unstructured text entries according to the ranking.

24. The system of claim 16, wherein identifying the subset of the first set of unstructured text entries according to the threshold based on the domain-specific weight score for each unstructured text entry includes one of:
identifying unstructured text entries having domain-specific weighted scores above a pre-specified threshold; and
identifying unstructured text entries having domain-specific weighted scores below the pre-specified threshold.

* * * * *